US010223256B1

(12) United States Patent
Schneider et al.

(10) Patent No.: US 10,223,256 B1
(45) Date of Patent: Mar. 5, 2019

(54) OFF-HEAP MEMORY MANAGEMENT

(71) Applicant: Pivotal Software, Inc., San Francisco, CA (US)

(72) Inventors: Darrel Scott Schneider, Aloha, OR (US); Hitesh Khamesra, Beaverton, OR (US); Asif Hussain Shahid, Almere (NL); Jagannathan Ramnarayanan, Portland, OR (US); Sudhir Menon, Portland, OR (US); Kirk Van Lund, Portland, OR (US); Lynn Gallinat, Hillsboro, OR (US)

(73) Assignee: Pivotal Software, Inc., San Francisco, CA (US)

( * ) Notice: Subject to any disclaimer, the term of this patent is extended or adjusted under 35 U.S.C. 154(b) by 140 days.

(21) Appl. No.: 14/526,283

(22) Filed: Oct. 28, 2014

Related U.S. Application Data

(60) Provisional application No. 61/896,369, filed on Oct. 28, 2013.

(51) Int. Cl.
    G06F 12/02 (2006.01)
(52) U.S. Cl.
    CPC .... G06F 12/0253 (2013.01); *G06F 2212/702* (2013.01)

(58) Field of Classification Search
    CPC .................. G06F 12/0253; G06F 2212/702
    See application file for complete search history.

(56) References Cited

U.S. PATENT DOCUMENTS

| 8,832,674 | B2 | 9/2014 | Harris et al. |
| 2012/0124305 | A1* | 5/2012 | Weissman ............ G06F 12/0223 711/160 |
| 2012/0222005 | A1* | 8/2012 | Harris .................. G06F 9/45504 717/120 |
| 2015/0112966 | A1* | 4/2015 | Tokuda ............. G06F 17/30463 707/718 |

* cited by examiner

*Primary Examiner* — Edward Dudek, Jr.

(57) ABSTRACT

A distributed parallel processing database that processes data in a Java environment allocates memory both on a Java heap and off a Java heap. The distributed parallel processing database includes multiple servers. Each server executes a Java virtual machine (JVM) in which data allocated to the server is processed. When a JVM of a server starts, the JVM can specify an off-heap memory size, based on a JVM start parameter. The server can designate memory of the specified size that is off JVM memory heap as off-heap memory. The off-heap memory is different from heap memory in the Java environment, and is managed by a garbage collector that is outside of the Java environment. The server can process data designated as off-heap memory eligible in the off-heap memory. The off-heap memory can improve database operations that create a large number of similar-sized objects in memory by reducing Java memory management overhead.

30 Claims, 3 Drawing Sheets

OFF-HEAP MEMORY MANAGEMENT

BACKGROUND

This specification relates to cloud computing.

In cloud computing, data can be distributed to a system of multiple computers connected by one or more communications networks. Each computer processes a portion of the data. The computers can process the data in parallel. Such a distributed system can handle web-oriented and data-intensive applications deployed in a virtualized environment. For example, a distributed system can be configured to perform functions of a relational database management system (RDBMS) over the Internet. Some challenges of a distributed system replacing a conventional RDBMS include performing data synchronization among multiple computers in the system, achieving low latency over a wide area network (WAN), scalability, and handling different schemas of multiple users.

SUMMARY

A distributed parallel processing database system that processes data in a Java environment allocates memory both on a Java heap and off a Java heap. The distributed parallel processing database system includes multiple servers in one or more locations. One or more of the servers may be cloud server virtual machines, one or more of which may be running on one of one or more cloud host machines. Each server executes a Java virtual machine (JVM) in which data allocated to the server is processed. When a JVM of a server starts, the JVM can specify an off-heap memory size, based on a JVM start parameter. The server can allocate memory of the specified size that is not part of the JVM memory heap and use it as off-heap memory. The off-heap memory is different from heap memory in the Java environment, and is managed by a garbage collector that is outside of the Java environment. The server can process data designated as off-heap memory eligible in the off-heap memory. The use of off-heap memory can improve database operations, particularly operations that create a large number of similar-sized objects in memory, by reducing Java memory management overhead.

Particular embodiments of the subject matter described in this specification can be implemented to realize one or more advantages. For example, the techniques described in this specification allow a user to process a very large database in memory, while improving central processing unit (CPU) utilization and avoiding pauses caused by Java garbage collection. Compared to conventional on-heap memory allocation, the techniques describe in this specification can result in significant performance improvements under various benchmarks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
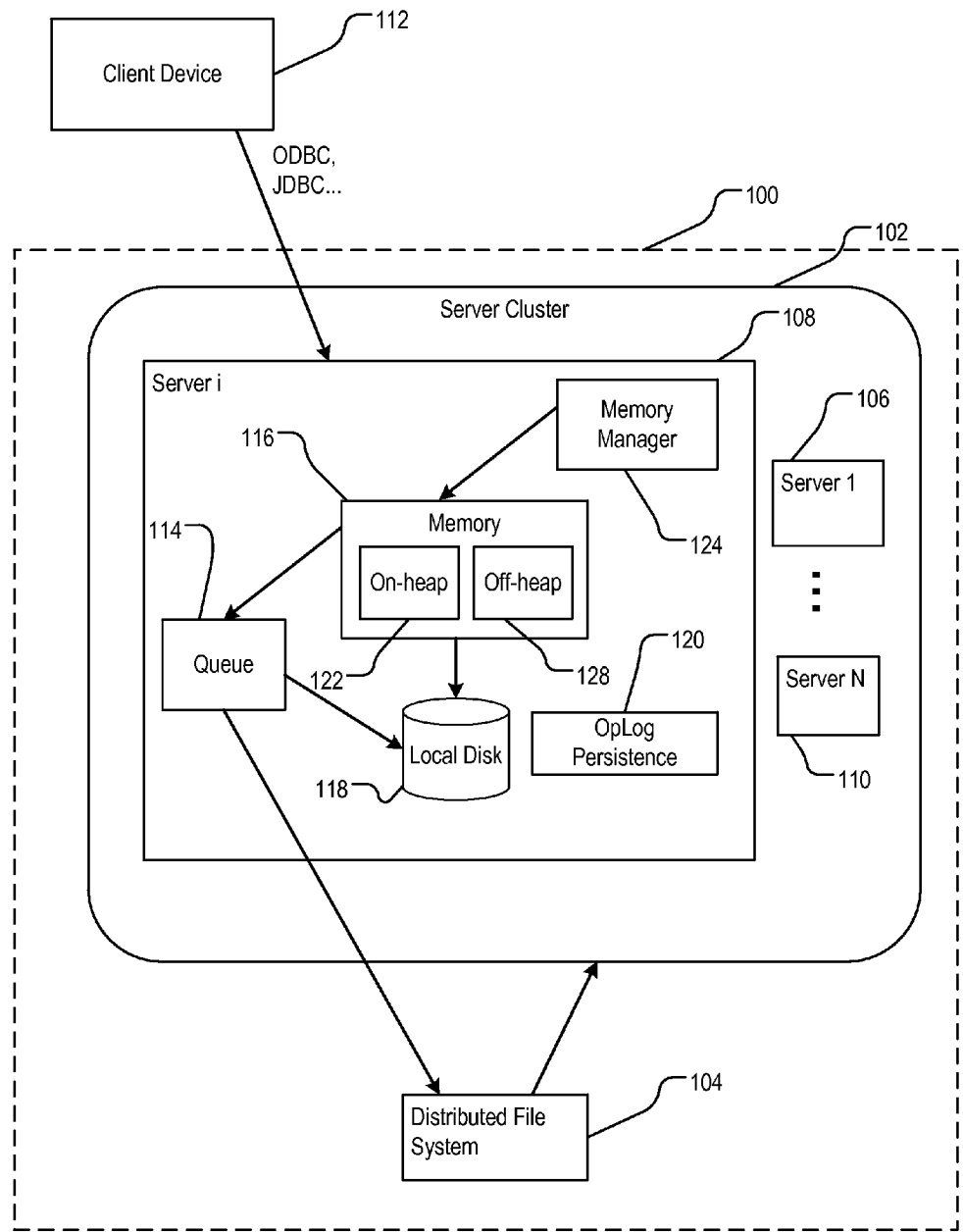
FIG. 1 is a block diagram of an example system implementing off-heap memory management.

FIG. 1 is a block diagram of an example system 100 implementing off-heap memory management. The system 100 is a memory-optimized, distributed data store configured to perform online transaction processing (OLTP) tasks including, for example, database query processing and data modeling. The system 100 includes a server cluster 102 for in-memory storage and processing of operational data, and a distributed file system 104 for data persistence and scalability. Data persistence includes storing non-operational data on disk. Scalability is an ability of the system 100 to store large volume of data including multiple large files, e.g., files the size of which reaches several terabytes. An example of the distributed file system 104 is the Hadoop™ Distributed File System (HDFS™). ("Hadoop" and "HDFS" are trademarks of the Apache Software Foundation.)

The server cluster 102 includes multiple members. The members are connected to each other through a communications network, e.g., a wide area network (WAN), in a peer-to-peer (P2P) topology. Each peer member maintains persistent communication channels to every other peer member in the server cluster 102. Each member includes a server. Each server includes a server program executing on one or more processors. Each server can access and manage memory and one or more disks local to the one or more processors. Each server can include a JVM, or another form of virtual machine, in which data operations are performed. In the example system shown, the members of the server cluster 102 include a first server 106, an i-th server 108, through an N-th server 110. The server cluster 102 can distribute a large database table having multiple data records for storage on the first server 106, i-th server 108, through N-th server 110 by partitioning the database table into logical buckets. Each bucket is a container for data and is associated with one or more servers for storing and processing the data in the container.

The server cluster 102 partitions the database table into the buckets according to a partition strategy associated with the database table, for example, as specified in a "PARTITION BY" clause in a "CREATE TABLE" statement. A data record in the database table can be distributed to one of the buckets based on the partition strategy, e.g., by hashing a primary key in the data record. Each logical bucket can be assigned to one or more of the first server 106, i-th server 108, through N-th server 110. Each of the first server 106, i-th server 108, through N-th server 110 can store a mapping between all clusters and all servers, including which server stores which bucket.

The server cluster 102 is configured to receive a data update request from a client device 112. The data update request can include a structured query language (SQL) statement, or a SQL-like statement, for inserting, deleting, or updating multiple rows of data in a databases table that is distributed among the first server 106, i-th server 108, through N-th server 110. The data update request can be replicated among the first server 106, i-th server 108, through N-th server 110. On each server, e.g., the server 108, the data update request is stored in a queue 114. The queue 114 can store multiple requests that, each in turn, cause data on the portion of the database table distributed to the server 108 to be updated.

The update can occur in memory 116, e.g., when the data being updated is designated as operational data. The data can be designated as operational data by a user, for example, using a data definition language (DDL) extension statement specifying a condition. Additionally or alternatively, the update can occur in the distributed file system 104. For example, when the server 108 ingests a large amount of data, e.g., when the data does not fit into the memory 116, the data can be streamed to the distributed file system 104. In addition, operational data can be evicted from memory and stored in the distributed file system 104.

The server 108 maintains operation logs ("oplogs") 120. The operation logs 120 are used by the server 108 to record a history of updates on each database table or on each data record, based on a log setting. The operation logs 120 can be persisted by the server 108 to the local disk 118 or the distributed file system 104 as log files according to the log setting. The operation logs 120 are compacted by the server 108 according to a compaction strategy. For example, a compaction strategy can specify that obsolete operations be removed from a log file when the size of the log file reaches a threshold, e.g., one gigabyte (1 GB). The log setting and compaction strategy can be specified by a user in a configuration file.

The server 108 performs most of the data processing, including allocating resources for processing the data, in a JVM. For example, the JVM of the server 108 can allocate on-heap memory 122 to various processes from storing operational data and for performing various data operations. The JVM allocates on-heap memory 122 on a Java memory heap and manages on-heap memory 122, for example, using one or more memory garbage collection functions of the JVM.

The server 108 includes a memory manager 124. The memory manager 124 allocates off-heap memory when the memory manager 124 determines that a data condition is satisfied. The off-heap memory is managed by the memory manager 124 directly through an operating system of the server 108, bypassing the JVM. The memory manager 124 manages the off-heap memory using a garbage collector that is different from the garbage collector of the JVM.

Figure 2:
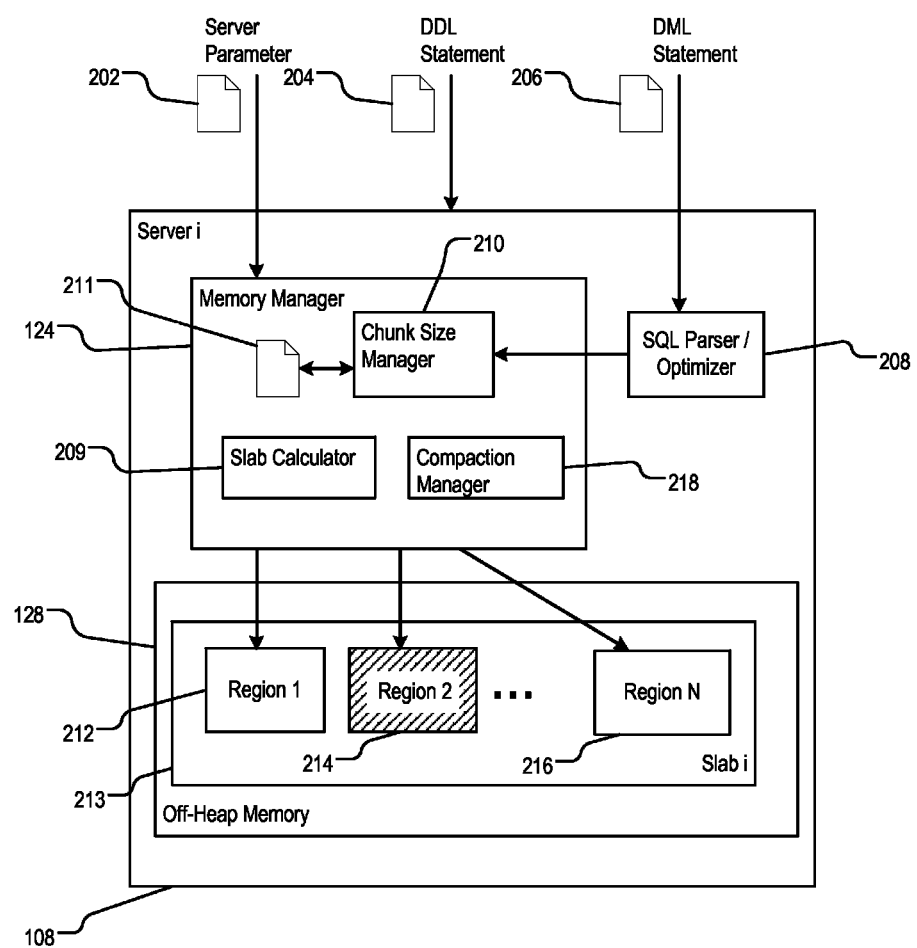
FIG. 2 is a block diagram illustrating components and operations of an example memory manager configured to manage off-heap memory.

FIG. 2 is a block diagram illustrating components and operations of an example memory manager 124 configured to manage off-heap memory. The memory manager 124 is a component of each server, e.g., server 108, of the server cluster 102 of FIG. 1. In some implementations, the memory manager 124 can include a software class that extends a Java memory manager class. The memory manager 124 allocates off-heap memory upon receiving a request. The request can be in the form of a parameter 202 for the server 108. The parameter 202 can be a command line parameter or a line in a configuration file for the server 108. The parameter 202 can specify a maximum off-heap memory size. If the parameter 202 does not specify a size, a default off-heap memory size (e.g., X gigabytes (GB)) is used. Some examples of the parameter 202 are listed below in Table 1.

off-heap-memory-size=4096 m
    off-heap-memory-size=10485760 k
    off-heap-memory-size=120 g
    Table 1

In Table 1, the "off-heap-memory-size" is the parameter, and the three different settings will cause the memory manager 124 to allocate 4,096 megabytes (MB), 10,485,760 kilobytes (KB) and 120 GB of off-heap memory, respectively. Each of the servers 106, 108, through 110 can have a same off-heap-memory-size. The memory manager 124 allocates the off-heap memory 128 at time the server 108 is started or at a later time when a database table that uses the off-heap memory 128 is created.

In some implementations, the memory manager 124 includes a slab calculator 209. The slab calculator 209 can organize the off-heap memory 128 into one or more equal-sized continuous regions ("slabs") for efficient garbage collection without using Java native garbage collector. The maximum slab size can be defined as the maximum integer value permitted in a Java environment of the server 108. For example, the slab size can be a value of Integer.MAX_VALUE, that may be approximately 2^31 in some Java implementations, corresponding to approximately 2 GB of memory. The maximum slab size can correspond to a maximum allowable object size. If the off-heap memory size is less than or equal to the maximum slab size, the entire off-heap memory can be designated as one slab. Otherwise, the slab calculator 209 can determine a slab size of as close to the maximum integer value where the off-heap memory 128 can be divided into approximately equal-sized slabs. Pseudo code for determining slab size ("slab_size") based on off-heap memory size ("off_heap_memory_size") is listed below in Table 2.

TABLE 2

```
MAXIMUM_SLAB_SIZE = 2 GB;
IF (off_heap_memory_size <MAXIMUM_SLAB_SIZE) {
  slab_size = off_heap_memory_size ;
} else if (off_heap_memory_size == MAXIMUM_SLAB_SIZE) {
  slab_size = Integer.MAX_VALUE;
} else {
  modulus = off_heap_memory_size % MAXIMUM_SLAB_SIZE;
  if (modulus == 0) {
    slab_size = Integer.MAX_VALUE;
  else {
    number_of_slabs = (off_heap_memory_size + modulus) /
      MAXIMUM_SLAB_SIZE;
    slab_size = off_heap_memory_size / number_of_slabs;
  }
}
```

The server 108 can process one or more database tables or one or more portions of a database table. Database tables can include data records designated as rows, each data record having one or more data fields designated as columns. A user who designs database tables ("designer") can specify that one or more database tables are off-heap memory eligible. An off-heap memory eligible database table can be manipulated, e.g., read or updated, in the off-heap memory 128. Database tables having rows having a uniform size may particularly benefit from the off-heap memory 128.

The designer can specify that a table can be manipulated in the off-heap memory 128 by adding a parameter in a data definition language (DDL) statement 204 that creates the table. An example statement for creating a table "example_table" having two columns is provided below in Table 3.

CREATE TABLE example_table
    (first_example_column INT NOT NULL,
    second_example_column DATE NOT NULL)
    OFFHEAP;
    Table 3

In the table example_table, each data record, or row, has a uniform size, e.g., size of an integer data field plus a size of a "date" data field. The "OFFHEAP" clause is an example parameter signaling to the memory manager 124 that the memory manager 124 shall provide at least a portion of the off-heap memory 128 to procedures manipulating the table "example_table."

The server 108 can receive a data manipulation language (DML) statement 206 for accessing multiple data records in the database table. The statement 206 can include one or more INSERT, DELETE, or UPDATE clauses that each access the data records. A SQL parser and optimizer 208 receives the statement 206 and determines that multiple data objects will be created, each corresponding to one of the data records. A chunk size manager 210 of the memory manager determines an amount of the off-heap memory 128 to allocate to each data object. The chunk size manager 210 detects a memory size requirement of a first data object to be created.

In some implementations, the chunk size manager 210 examines a free list 211. The free list 211 is a data structure storing references to free regions of off-heap memory 128. The free list 211 can be stored in on-heap memory 122 (of FIG. 1). The chunk size manager 210 seeks a previously allocated and presently free memory region in the free list 211. If the chunk size manager 210 identifies a memory region from the free list 211 that satisfies the memory size requirement, the chunk size manager 210 can allocate the region to the data object. For example, the chunk size manager 210 identifies memory region 212 in an i-th slab, slab 213, of N slabs from the free list 211. The chunk size manager 210 determines that memory region 212 satisfies the memory size requirement of the first data object. In response, the chunk size manager 210 allocates memory region 212 to the first data object.

If the chunk size manager 210 does not identify a region from the free list 211 that satisfies the data requirement, the chunk size manager 210 examines each slab of memory, including slab 213, for free space that can be allocated. The chunk size manager 210 can maintain an atomic counter for each slab to remember how much memory in the respective slab has already been allocated. Allocations increment the counter. Compaction of the slabs decreases the counter. For example, the chunk size manager 210 detects a memory size requirement of a second data object to be created. The chunk size manager 210 determines no region in the free list satisfies the memory size requirement. The chunk size manager 210 determines that slab 213 has enough free space. The chunk size manager 210 can then allocate, in the free space, region 214 that satisfies the memory size requirement of the second data object.

In some implementations, the chunk size manager 210 detects a memory size requirement of a first data object to be created. The chunk size manager 210 then increases the memory size requirement by a pre-specified amount or ratio, and designates the increased size as a row size of the database table. For example, if the memory size requirement is 800 bytes, the chunk size manager 210 can increase the requirement to 1 KB, and designate 1 KB as the row size of the database table. The chunk size manager 210 can allocate memory region 212, region 214, through an N-th region, region 216 each having a size of 1 KB.

The memory manager 124 includes compaction manager 218. The compaction manager 218 can compact the free list 211 under various trigger conditions. Compacting the free list 211 can include combining contiguous regions of the free list 211. Additionally, compacting the free list 211 can include removing the combined entries from free list 211 and designating the combined contiguous regions as free space, so that the contiguous regions can be used for a larger size data object. The compaction manager 218 can trigger when an allocation cannot find an entry in the free list 211 and cannot find a slab having enough free space. The compaction manager 218 aggregates all free regions and a region for each slab's free memory and concatenate adjacent regions into a single region. The compaction manager 218 designates the aggregated single region as one or more new slabs each having an empty free list. If none of the new slab is big enough to satisfy a memory request, the compaction manager 218 can throw an out of memory exception.

Figure 3:
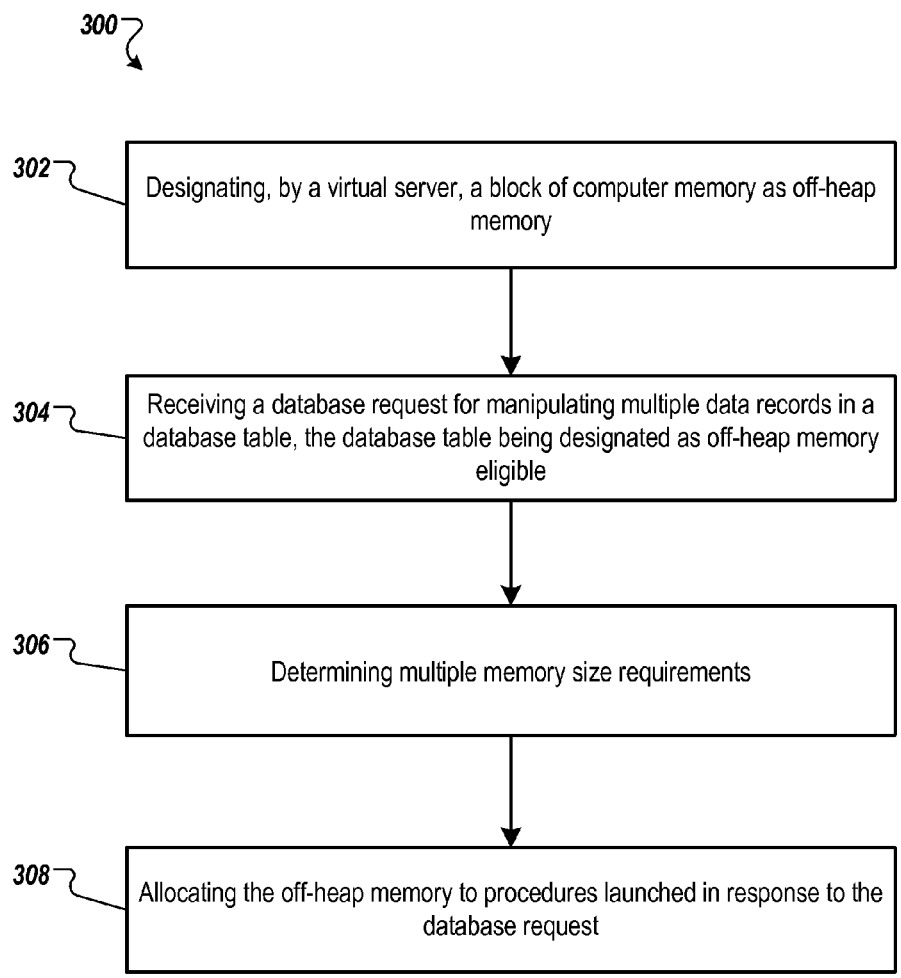
FIG. 3 is a flowchart illustrating an example procedure of managing off-heap memory.

FIG. 3 is a flowchart illustrating an example procedure 300 of managing off-heap memory. The procedure 300 can be performed by an example system, e.g., the server 108 of FIG. 1 and FIG. 2.

A virtual server of the system designates (302) a block of computer memory as off-heap memory accessible by procedures manipulating database tables. The off-heap memory includes memory outside of a memory heap of the virtual server. The virtual server can be a JVM. The memory heap can be a memory heap managed by the JVM. The off-heap memory can be managed by a memory manager that is different from a garbage collector of the JVM. For example, the memory manager can include an extension of a Java memory manager class that reaches outside of the JVM. The memory manager can include a garbage collector that is different from a Java memory garbage collector.

The system receives (304) a database request for manipulating multiple data records in a database table. The database table is designated as off-heap memory eligible. The database table can a table designated as off-heap memory eligible in DDL statement creating the table. The database request can be a SQL statement for selecting, inserting, deleting, or updating the records in the database table.

The system determines (306) multiple of memory size requirements. Each memory size requirement is associated with memory need of a procedure manipulating a corresponding data record in the database table. The memory need can be a size of a data object created by a procedure. In some implementations, determining the memory size requirements includes determining a row size of the database table, and designating the row size as each of the memory size requirements. The row size can include an estimated size ceiling of each data record in the database table. Determining the row size of the database of the table can include determining a record size of a first data record in the database table being manipulated, and designating a memory size that is larger than the record size by a pre-specified amount or ratio as the row size.

The system allocates (308) the off-heap memory to procedures launched in response to the database request. Allocating the off-heap memory includes providing a region of the off-heap memory to each of the procedures. Each region has a memory size that corresponds to the memory size requirement of the respective procedure. For example, each region can have a same size, which is the row size.

Allocating the off-heap memory to the procedures can include dividing the off-heap memory into one or more slabs, determining, for each procedure, whether the memory requirement of the each procedure is met by a region of memory referenced in a free list, and, upon determining that the memory requirement is met, allocating the region that meets the memory requirement to the respective procedure. Upon determining that the memory requirement of the each procedure is not met, the system can allocate a region in a free space of a slab to a procedure that requires more memory than every region referenced in the free list. The free space can be in an existing slab. In case the system determines that no free space in existing slabs satisfies the memory requirement, the system aggregates free spaces in multiple existing slabs to create a new slab to create a new slab and, allocates a region in the new slab that satisfies the memory size requirement to the corresponding procedure.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   designating, by one or more computers, a block of computer memory as off-heap memory accessible by procedures manipulating database tables, the off-heap memory including memory outside of a memory heap of a virtual server executing on the one or more computers;
   receiving a database request for manipulating, in the virtual server, a plurality of data records in a database table, the database table being designated as off-heap memory eligible by a statement creating the database table;
   determining, by the one or more computers, a plurality of memory size requirements, each memory size requirement associated with memory need of a procedure manipulating a corresponding data record in the database table; and
   allocating, by the one or more computers, the off-heap memory to procedures launched in response to the database request, including providing a respective region of the off-heap memory to each of the procedures, each region having a respective memory size that corresponds to the memory size requirement of the respective procedure.

2. The method of claim 1, wherein:
   the virtual server is a Java virtual machine (JVM),
   the memory heap is a JVM memory heap, and
   the off-heap memory is managed by a memory manager that is different from a garbage collector of the JVM.

3. The method of claim 1, wherein the database table is designated as off-heap memory eligible by the statement using an off-heap parameter.

4. The method of claim 1, wherein the database request is a structured query language (SQL) statement for selecting, inserting, deleting, or updating the records in the database table.

5. The method of claim 1, wherein determining the memory size requirements comprises:
   determining a row size of the database table, the row size including an estimated size ceiling of each data record in the database table, and
   designating the row size as each of the memory size requirements.

6. The method of claim 5, wherein determining the row size of the database of the table comprises:
   determining a record size of a first data record in the database table being manipulated; and
   designating a memory size that is larger than the record size by a pre-specified amount or ratio as the row size.

7. The method of claim 5, wherein each region has a memory size that corresponds to the row size.

8. The method of claim 1, wherein allocating the off-heap memory to the procedures comprises:
   dividing the off-heap memory into one or more slabs, each slab being a portion of the off-heap memory;
   determining, for each procedure, whether the memory requirement of the each procedure is met by a region of memory referenced in a free list; and
   upon determining that the memory requirement is met, allocating the region that meets the memory requirement to the respective procedure.

9. The method of claim 8, comprising: upon determining that the memory requirement of the each procedure is not met, allocating a region in a free space of a slab to a procedure that requires more memory than every region referenced in the free list.

10. The method of claim 8, wherein allocating the region in the free space of a slab to a procedure comprises:
    determining that no free space in existing slabs satisfies the memory requirement;
    in response, aggregating free spaces in the existing slabs to create a new slab; and
    allocating a region in the new slab to the procedure.

11. A non-transitory storage device storing instructions operable to cause one or more computers to perform operations comprising:
    designating a block of computer memory as off-heap memory accessible by procedures manipulating database tables, the off-heap memory including memory outside of a memory heap of a virtual server executing on the one or more computers;
    receiving a database request for manipulating, in the virtual server, a plurality of data records in a database table, the database table being designated as off-heap memory eligible by a statement creating the database table;
    determining a plurality of memory size requirements, each memory size requirement associated with memory need of a procedure manipulating a corresponding data record in the database table; and
    allocating the off-heap memory to procedures launched in response to the database request, including providing a respective region of the off-heap memory to each of the procedures, each region having a respective memory size that corresponds to the memory size requirement of the respective procedure.

12. The non-transitory storage device of claim 11, wherein:
the virtual server is a Java virtual machine (JVM),
the memory heap is a JVM memory heap, and
the off-heap memory is managed by a memory manager that is different from a garbage collector of the JVM.

13. The non-transitory storage device of claim 11, wherein the database table is designated as off-heap memory eligible by the statement using an off-heap parameter.

14. The non-transitory storage device of claim 11, wherein the database request is a structured query language (SQL) statement for selecting, inserting, deleting, or updating the records in the database table.

15. The non-transitory storage device of claim 11, wherein determining the memory size requirements comprises:
determining a row size of the database table, the row size including an estimated size ceiling of each data record in the database table, and
designating the row size as each of the memory size requirements.

16. The non-transitory storage device of claim 15, wherein determining the row size of the database of the table comprises:
determining a record size of a first data record in the database table being manipulated; and
designating a memory size that is larger than the record size by a pre-specified amount or ratio as the row size.

17. The non-transitory storage device of claim 15, wherein each region has a memory size that corresponds to the row size.

18. The non-transitory storage device of claim 11, wherein allocating the off-heap memory to the procedures comprises:
dividing the off-heap memory into one or more slabs, each slab being a portion of the off-heap memory;
determining, for each procedure, whether the memory requirement of the each procedure is met by a region of memory referenced in a free list; and
upon determining that the memory requirement is met, allocating the region that meets the memory requirement to the respective procedure.

19. The non-transitory storage device of claim 18, the operations comprising: upon determining that the memory requirement of the each procedure is not met, allocating a region in a free space of a slab to a procedure that requires more memory than every region referenced in the free list.

20. The non-transitory storage device of claim 18, wherein allocating the region in the free space of a slab to a procedure comprises:
determining that no free space in existing slabs satisfies the memory requirement;
in response, aggregating free spaces in the existing slabs to create a new slab; and
allocating a region in the new slab to the procedure.

21. A system comprising:
one or more computers; and
a non-transitory storage device storing instructions operable to cause the one or more computers to perform operations comprising:
designating a block of computer memory as off-heap memory accessible by procedures manipulating database tables, the off-heap memory including memory outside of a memory heap of a virtual server executing on the one or more computers;
receiving a database request for manipulating, in the virtual server, a plurality of data records in a database table, the database table being designated as off-heap memory eligible by a statement creating the database table;
determining a plurality of memory size requirements, each memory size requirement associated with memory need of a procedure manipulating a corresponding data record in the database table; and
allocating the off-heap memory to procedures launched in response to the database request, including providing respective a region of the off-heap memory to each of the procedures, each region having a respective memory size that corresponds to the memory size requirement of the respective procedure.

22. The system of claim 21, wherein:
the virtual server is a Java virtual machine (JVM),
the memory heap is a JVM memory heap, and
the off-heap memory is managed by a memory manager that is different from a garbage collector of the JVM.

23. The system of claim 21, wherein the database table is designated as off-heap memory eligible by the statement using an off-heap parameter.

24. The system of claim 21, wherein the database request is a structured query language (SQL) statement for selecting, inserting, deleting, or updating the records in the database table.

25. The system of claim 21, wherein determining the memory size requirements comprises:
determining a row size of the database table, the row size including an estimated size ceiling of each data record in the database table, and
designating the row size as each of the memory size requirements.

26. The system of claim 25, wherein determining the row size of the database of the table comprises:
determining a record size of a first data record in the database table being manipulated; and
designating a memory size that is larger than the record size by a pre-specified amount or ratio as the row size.

27. The system of claim 25, wherein each region has a memory size that corresponds to the row size.

28. The system of claim 21, wherein allocating the off-heap memory to the procedures comprises:
dividing the off-heap memory into one or more slabs, each slab being a portion of the off-heap memory;
determining, for each procedure, whether the memory requirement of the each procedure is met by a region of memory referenced in a free list; and
upon determining that the memory requirement is met, allocating the region that meets the memory requirement to the respective procedure.

29. The system of claim 28, the operations comprising: upon determining that the memory requirement of the each procedure is not met, allocating a region in a free space of a slab to a procedure that requires more memory than every region referenced in the free list.

30. The system of claim 28, wherein allocating the region in the free space of a slab to a procedure comprises:
determining that no free space in existing slabs satisfies the memory requirement;
in response, aggregating free spaces in the existing slabs to create a new slab; and
allocating a region in the new slab to the procedure.

* * * * *